Sept. 3, 1929.   E. L. BALL   1,726,795
NOISELESS BALL VALVE
Filed March 31, 1928
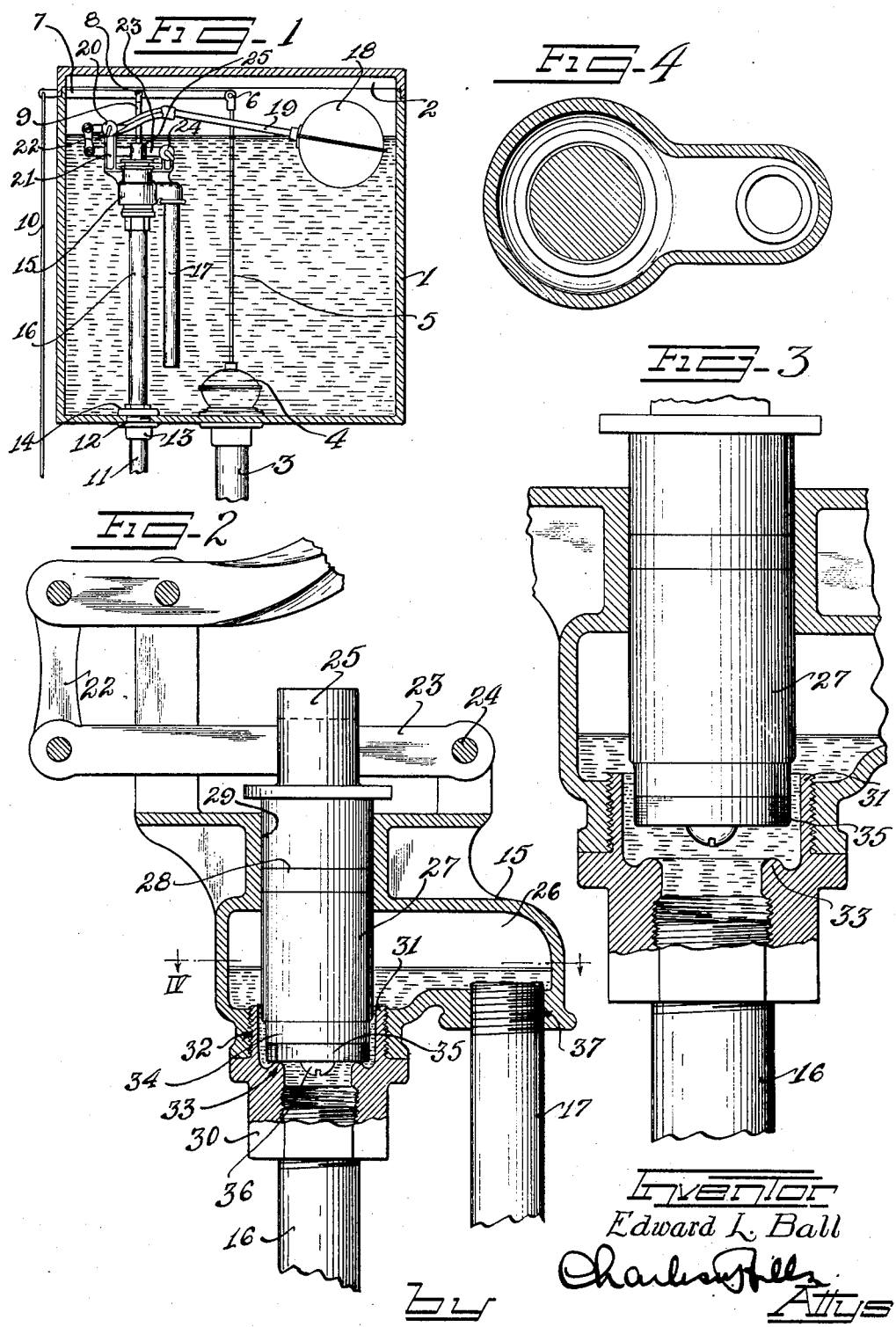
Inventor
Edward L. Ball Patented Sept. 3, 1929.

1,726,795

UNITED STATES PATENT OFFICE.

EDWARD L. BALL, OF BURLINGTON, WISCONSIN, ASSIGNOR TO BURLINGTON BRASS WORKS, OF BURLINGTON, WISCONSIN, A CORPORATION OF WISCONSIN.

NOISELESS BALL VALVE.

Application filed March 31, 1928. Serial No. 266,230.

This invention relates to water valves.

The valve of the invention is more particularly adapted for use as a ball valve in water tanks or water closets, although the same may be used in faucets and the like.

It ofttimes happens that the ball valves now in use are not perfected to operate without considerable noise, which noise is very objectionable. The valves of this invention overcome the objectionable noise when the tank is filling and positively eliminate all noise when the ball valve is closing and the tank is being filled with the required amount of water.

An object of the invention is to provide a ball valve which admits water to a tank with minimum noise, and which shuts off or closes with no noise whatsoever.

Another object of the invention is to provide a ball valve which is efficient in operation and economical to manufacture.

Another object of the invention is to provide a ball valve which admits water to a tank with minimum noise, and one which effectively seals the inlet pipe when closed to prevent leakage.

Another object of the invention is to provide a ball valve which admits water to a tank in larger volume than heretofore, thereby more quickly filling the tank, and in which the filling of the tank and closing of the valve is accomplished without noise.

A further object of the invention is to provide a noiseless ball valve which is sturdy, strong and durable.

According to the invention, a fitting or nipple having an annular valve seat is arranged on the inlet pipe within the tank, which fitting connects the inlet pipe to the valve chamber casing. A restricted opening or well is provided about the valve seat by a collar, which may be formed by lengthening the exteriorly threaded end of the fitting where it is threaded into the casing, the well or space within the collar being of slightly greater diameter than the valve seat. A plunger carrying a valve at its lower end is provided and arranged within the valve casing so that the valve carried thereby is at all times within said well. The diameter of the plunger within the well is slightly less than the diameter of the well, so that when the valve is opened the inflowing water strikes against the end of the plunger and is deflected evenly against the collar, flowing over the upper edge of the same into the valve chamber. This spreading of the inflowing water eliminates the noise of the water. The inlet valve seat as well as the upper end of the collar are arranged below the outlet, so that a water seal is at all times maintained about the inlet. The force of the water entering the tank controlled by such valve is checked, resulting in a quiet operation of the valve and its associated parts.

The above, other and further objects of the invention will be apparent from the following description, drawings and appended claims.

On the drawings:

The accompanying drawings illustrate a preferred embodiment of the invention and the views thereof are as follows:

Figure 1 is a vertical sectional view through a tank, showing the valve and its associated parts.

Figure 2 is an enlarged vertical sectional view of the valve casing showing the valve in closed position.

Figure 3 is an enlarged vertical section of the valve casing showing the valve in full open position.

Figure 4 is a horizontal section on line IV—IV of Figure 2.

As shown on the drawings:

A water closet tank 1 is shown, which is of conventional form. The tank is provided with the usual top 2. An outlet pipe 3 leads from the tank to the water closet and is controlled by the usual rubber valve 4. The valve 4 is attached to the lower end of a rod 5, which is pivoted at 6 to a lever 7 which lever in turn is pivoted at 8 to a rod 9 secured to the casing of the inlet valve. The lever 7 extends through an opening in the tank 1 and has a rod 10 connected to a handle for operation.

The tank is supplied by water through an inlet pipe 11, which is secured in an aperture 12 in the bottom of the tank by the usual nuts 13 and 14, which make a watertight connection at this point.

The valve chamber casing 15 is connected to the inlet pipe 11 by a pipe 16.

Outlet pipe 17 is attached to the valve casing 15 and is directed downwardly in the usual manner, terminating a short distance above the bottom of the tank 1.

The usual float 18 is attached to the end of an arm 19 which is pivoted at 20 to an upright member 21 integral with the casing 15. A link 22 is pivoted at one end to the arm 19 and at the other end to a lever 23 which is pivoted at its end 24 to casing 15.

The lever 23 passes through the upper end 25 of the plunger which operates within the casing 15 to control the inflow of water to said casing through the inlet pipes 11 and 16.

Figure 2 of the drawings shows the interior of the casing 15 as having a chamber 26.

The plunger which controls the inflow of water from pipe 16 comprises a cylindrical body 27 integral with the upper end 25. A packing ring 28 is arranged about said plunger near the upper end thereof to seal the opening 29 in the casing 15, through which the plunger 27 operates.

A fitting or nipple 30 is threaded onto the upper end of the inlet pipe 16 and has a reduced exteriorly threaded extension 31 which is threaded into the casing 15 at 32. The extension or collar 31 is of some length, so as to project into the chamber 26 of the casing.

An annular valve seat 33 is formed in the nipple 30 and in diameter is a trifle larger than the diameter of the inlet pipe 16. The surface of the annular valve seat 33 is convex.

The lower end of the plunger 27 is reduced slightly in diameter at 34.

A disc valve 35 is attached to the lower end of the plunger by a screw 36 or other suitable attaching means. The valve 35 is preferably of resilient material.

The outlet pipe 17 from the chamber 26 of the casing 15 is threaded into the casing at 37 and arranged thereon so as to have its end above the valve seat 33, and also above the collar 31 of the nipple 30.

The diameter of the plunger 27 is slightly less than the interior diameter of the well formed in the nipple 30 by the collar 31. The reduced end 34 of the plunger 27, as before stated, is slightly less than the diameter of the balance of the plunger 27.

Vertical movement of the plunger and its connected valve is accomplished by the rise and fall of the ball 18 in the tank 1 as the water therein changes its level.

The arrangement of the parts shown in Figures 1 and 2 disclose the valve as closed by the ball 18 being moved upwardly as the tank 1 is filled to proper height.

When the handle attached to the rod 10 is actuated to empty the tank 1 the ball 18 falls with the water as the same is discharged through the outlet or flush pipe 3, opening the valve 35 by said movement.

Figure 3 shows the position of the plunger and the valve when the valve is in full open position.

It will be noted that when the valve is in full open position, as shown in Figure 3, that the lower end of the plunger 27 and its attached valve 35 lie below the upper edge of the collar 31.

When the valve 35 is moved upwardly from the seat 33 the inflowing water from the inlet pipe 16 strikes against the valve 35. Because of the restricted opening about the lower end of the plunger formed by the collar 31 the inflowing water will be spread evenly against said collar and will flow upwardly over the edge of the same evenly and without noise.

When the valve 35 in the closing operation moves downwardly making the final and closing contact with seat 33 the well formed in the nipple 30 by the collar 31 produces a condition wherein there is absolutely no noise in the final closing of the valve.

The outlet, as before stated, is disposed above the inlet to the chamber, therefore a water seal will be maintained about the inlet and in the well formed by the collar 31 surrounding the valve and valve plunger. This seal is effective when the valve is opened to prevent noise of the inflowing water.

The inflowing water, when the valve is open, will raise the head within the valve chamber 26, discharging the same through the outlet pipe 17. No air reaches the inlet, hence there is no occasion for pounding or other noise present with the ball valves now in use.

The operation of the apparatus is as follows:

The parts being in the position shown in Figures 1 and 2, a handle connected to the rod 10 is operated, raising the rubber ball 4 from the flush pipe 3, whereupon the water within the tank 1 discharges by gravity through said pipe, the ball 18 following the head of the water downwardly as the same is discharged.

The downward movement of the ball 18 will, by reason of its linked connection to the plunger 27, raise said plunger and with it lift the valve 35 from its seat 33, thereupon admitting water to the tank 1 through the inlet 16 and the nipple, the water striking against the lower end of the plunger and being spread over the edge of the collar 31 into the valve chamber 26, the water continuing to flow until the ball 18 reaches its uppermost position which is that shown in Figure 1, whereupon the valve 35 is seated against the annular valve seat 33.

The valve seat 33 being convex and the valve 35 being made of resilient material assures at all times a water tight fitting at the valve, thus preventing leakage.

The provision of the restricted well about the inlet valve eliminates to a large extent pressure against the valve from the water remaining in the valve casing, and the pressure resulting from the head of water in the tank 1.

The valve of my invention has, herein, been described in connection with a water closet valve. However, I do not wish to be understood as limiting my invention to such use, as the valve structure of the invention may be used on other water valves or faucets with the same results.

While I have described more or less precisely the details of construction of my invention, yet I do not wish to be understood as limiting myself thereto, as I am aware that changes may be made in the proportion of parts and that equivalents may be substituted without departing from the spirit and scope of my invention.

I claim as my invention:

1. A ball valve structure comprising a casing forming a chamber, an inlet and an outlet communicating with said chamber, an annular valve seat about said inlet, an annular collar about said seat within said casing and extending above the same and terminating below the outlet, a plunger having a cylindrical part of slightly smaller diameter than said collar entering within said collar and carrying a resilient valve at its lower end for engaging said seat, and means for operating said plunger to open and close said valve, said valve being within said collar when in wide open position to deflect the inflowing water against said collar for checking the force thereof to eliminate noise.

2. A ball valve structure comprising a casing forming a chamber, an inlet and an outlet communicating with said chamber, an annular valve seat about said inlet, an annular collar about said seat within said casing and extending above the same and terminating below the outlet, a plunger having a cylindrical part entering within said collar and carrying a resilient valve at its lower end for engaging said seat, and means for operating said plunger to open and close said valve, said valve being within said collar when in wide open position to deflect the inflowing water against said collar for checking the force thereof to eliminate noise, said outlet being arranged in said chamber above said inlet and the top of said collar to form a water seal about said valve.

3. A ball valve structure comprising a chamber, an inlet and an outlet communicating with said chamber, a valve seat about the end of said inlet, a plunger in said casing having a resilient valve at its lower end for engaging said seat, a collar about said valve seat extending into said chamber, the lower end of said plunger lying below the upper margin of this collar when said plunger is in uppermost position, the collar forming a well of restricted size about said plunger to spread inflowing water evenly over said collar and into said chamber.

4. A ball valve structure comprising a casing forming a chamber, an inlet pipe, an outlet pipe communicating with said chamber, a cylindrical plunger vertically slidable in said casing, a valve disc of resilient material attached to the lower end of said plunger, a fitting on the end of said inlet pipe, said fitting having a threaded annular flange in threaded engagement with said casing extending into said chamber, an annular valve seat in said fitting within and spaced from said flange and lying below the top of said flange, the outlet from said chamber arranged above the top of said flange, said plunger arranged to enter said flange and to seat the valve on said valve seat with the valve within said flange at all times, thereby forming a restricted inlet opening for the inflow of water from said inlet pipe to reduce the velocity thereof when said valve is opened, and means for operating said plunger to open and close said valve.

5. A ball valve structure comprising a casing forming a chamber, an inlet, an outlet communicating with said chamber, a fitting on the end of said inlet, said fitting including an annular collar extending into said valve chamber, the top of said collar being below said outlet, an annular valve seat within said collar near the lower end of the same, a cylindrical plunger reciprocable in said casing and arranged with its lower end within said collar, a disc valve of resilient material on the lower end of said plunger, said plunger being slightly reduced in diameter near its lower end and arranged in such manner that a portion thereof of greater diameter lies within said collar when the valve is in closed position in close proximity to said collar, and means for actuating said plunger.

6. A valve structure comprising a casing forming a chamber, an inlet and an outlet communicating with said chamber, the end of the inlet comprising an enlarged collar extending into the chamber, an annular valve seat within said collar, a plunger carrying a valve at its end arranged to reciprocate with the valve thereon always within said collar to restrict inflow of water when valve is open, and means for actuating said plunger.

In testimony whereof I have hereunto subscribed my name.

EDWARD L. BALL.